United States Patent [19]

Eldridge et al.

[11] Patent Number: 4,791,440

[45] Date of Patent: Dec. 13, 1988

[54] THERMAL DROP-ON-DEMAND INK JET PRINT HEAD

[75] Inventors: Jerome M. Eldridge, Los Gatos; Gary S. Keller; Francis C. Lee, both of San Jose; George N. Nelson, Milpitas; Graham Olive, San Jose, all of Calif.

[73] Assignee: International Business Machine Corporation, Armonk, N.Y.

[21] Appl. No.: 45,952

[22] Filed: May 1, 1987

[51] Int. Cl.[4] .......... G01D 15/16

[52] U.S. Cl. .......... 346/140 R

[58] Field of Search .......... 346/140, 76 PH

[56] References Cited

U.S. PATENT DOCUMENTS

| | | | |
|---|---|---|---|
| 4,030,408 | 6/1977 | Miwa | 346/76 PH X |
| 4,458,256 | 7/1984 | Shirato | 346/140 |
| 4,506,272 | 3/1985 | Arai | 346/76 PH |
| 4,520,373 | 5/1985 | Ayata et al. | 346/140 |
| 4,522,449 | 6/1985 | Hayward | 361/410 X |
| 4,560,962 | 12/1985 | Barrow | 361/410 X |
| 4,601,777 | 7/1986 | Hawkins et al. | 156/626 |
| 4,611,219 | 9/1986 | Sugitani | 346/140 |
| 4,617,576 | 10/1986 | Moeller | 346/76 PH |
| 4,633,274 | 12/1986 | Matsuda | 346/140 |
| 4,683,481 | 7/1987 | Johnson | 346/140 |
| 4,734,717 | 3/1988 | Rayfield | 346/140 |

*Primary Examiner*—Joseph W. Hartary
*Attorney, Agent, or Firm*—Otto Schmid, Jr.

[57] ABSTRACT

A thermal drop-on-demand ink jet print head in which an array of heating means is provided on one surface of a substrate member. A common electrode provides electrical contact to the heating means, and an array of data electrodes provides electrical contact to individual ones of the heating means. An array of feed through conductors is provided which pass through to the opposite surface of the substrate member to provide electrical contact between one of the data electrodes and one of an array of conductors leading to spaced solder pads on the opposite surface of the substrate member. A nozzle plate is mounted adjacent to the substrate member with a nozzle adjacent to each of the heating means so that, upon connection of an electrical signal to one of the solder pads, the corresponding heating means is energized and a drop of ink is ejected from the adjacent nozzle. Various embodiments are described in which multiplexing techniques are used to achieve a reduction in electrical connections and electronic drivers.

6 Claims, 10 Drawing Sheets

THERMAL DROP-ON-DEMAND INK JET PRINT HEAD

BACKGROUND OF THE INVENTION

1. Field of the Invention

This invention relates to an ink jet printing system and more particularly to a thermal drop-on-demand ink jet printing system.

2. Description of the Prior Art

A thermal drop-on-demand ink jet printing system is known in which a heater is selectively energized to form a "bubble" in the adjacent ink. The rapid growth of the bubble causes an ink drop to be ejected from a nearby nozzle. Printing is accomplished by energizing the heater each time a drop is required at that nozzle position to produce the desired printed image.

One thermal drop-on-demand ink jet printing system is described in U.S. Pat. No. 4,520,373 to Ayata et al. The print head in the Ayata et al system utilizes a heater substrate in which the ink drops are ejected in a direction parallel to thc plane of the heater element. The Ayata system comprises a plurality of chips each having the heater elements, the conductor elements and a control transistor array all on one side of a chip, with a heat sink on the other side of the chip.

Another thermal drop-on-demand ink jet printing system is described in U.S. Pat. No. 4,601,777 to Hawkins et al in which the ink drops are ejected in a direction normal to the plane of the heater element. The Hawkins printer comprises a chip which includes an array of heating elements and addressing electrodes, a silicon substrate into which an array of grooves is anisotropically etched, and a fixedly mounted electrode board. The silicon substrate is bonded to the heater chip so that one end of the grooves is aligned to serve as the nozzle and a second recess serves as the ink manifold. Electrical leads from the heater chip are wire bonded to corresponding conductor pads on the electrode board.

The prior art thermal drop-on-demand ink jet printing systems are unsuitable for a high resolution array having a large number of channels since their design does not permit the required electrical connections to be made in a compactly designed print head. Neither of the two designs disclose a heater chip with through hole electrical connections to solder pads on the opposite side of the heater chip.

SUMMARY OF THE INVENTION

It is therefore the principal object of this invention to provide a thermal drop-on-demand ink jet printing system capable of printing with high resolution with a print head having a large number of channels. In accordance with the invention, the objective is achieved by providing an array of heating means on one surface of an electrically insulating substrate member, a first array of electrical connection members on the first surface in electrical contact with the array of heating means, a second array of electrical connection members on the reverse surface of the substrate member, and an array of electrical conduction members passing through the substrate member to provide electrical contact between the first and second arrays of electrical connection members. A nozzle plate is mounted adjacent to the substrate member with a nozzle adjacent to each of the heating means so that, upon connection of an electrical signal to a selected one of the second array of electrical connection members, a drop of ink is ejected from the corresponding nozzle.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENTS

Figure 1:
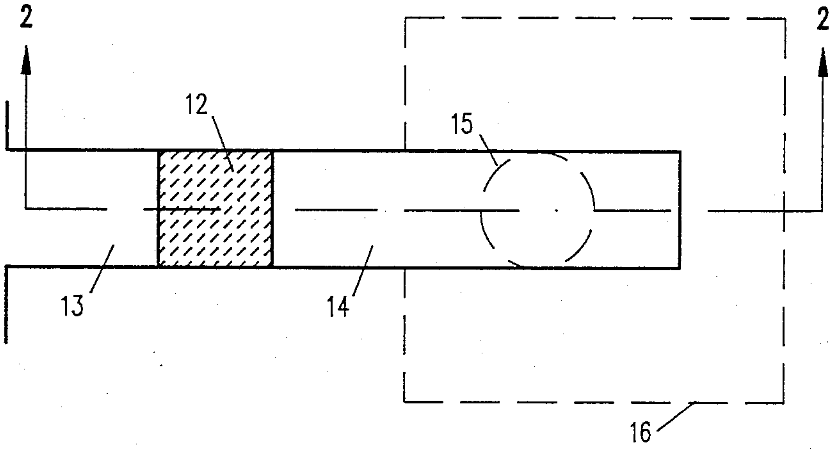
FIG. 1 is a top view showing one thermal ink jet print head according to the present invention.
Figure 2:
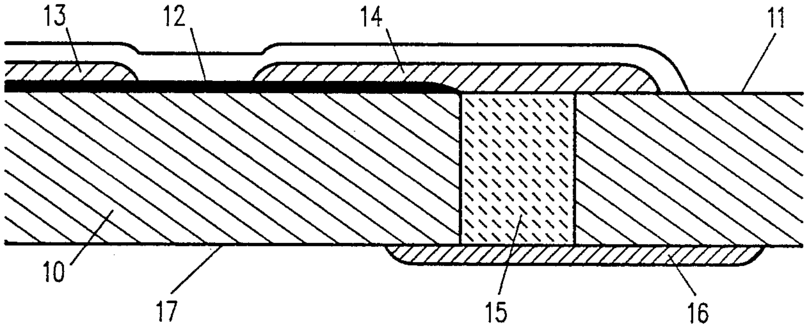
FIG. 2 is a section view along the lines 2—2 of FIG. 1.

Referring to FIGS. 1 and 2, the thermal drop-on-demand ink jet print head, according to the present invention, comprises an electrically insulating substrate member 10, upon one surface 11 of which is formed an array of resistive heater elements 12, only one of which is shown in FIGS. 1 and 2 of the drawings. A common electrode 13, and an array of control electrodes 14 are provided in electrical contact with each resistive heater element 12. The control electrodes 14 each extend to an electrical contact with a conductive feed through element 15 which passes through the substrate 10 and makes electrical contact with a solder pad 16 on the reverse surface 17 of substrate 10. Substrate member 10 should also have suitable thermal characteristics. These characteristics include forcing heat into the marking fluid such as ink at the beginning of the heat cycle and permitting the heat to dissipate into the substrate later in the heat cycle to prevent heat buildup in the print head. One suitable structure of the substrate member 10 comprises a thermal delay layer, such as a $SiO_2$ layer 2 to 3 microns thick, on a suitable ceramic substrate material.

Figure 3:
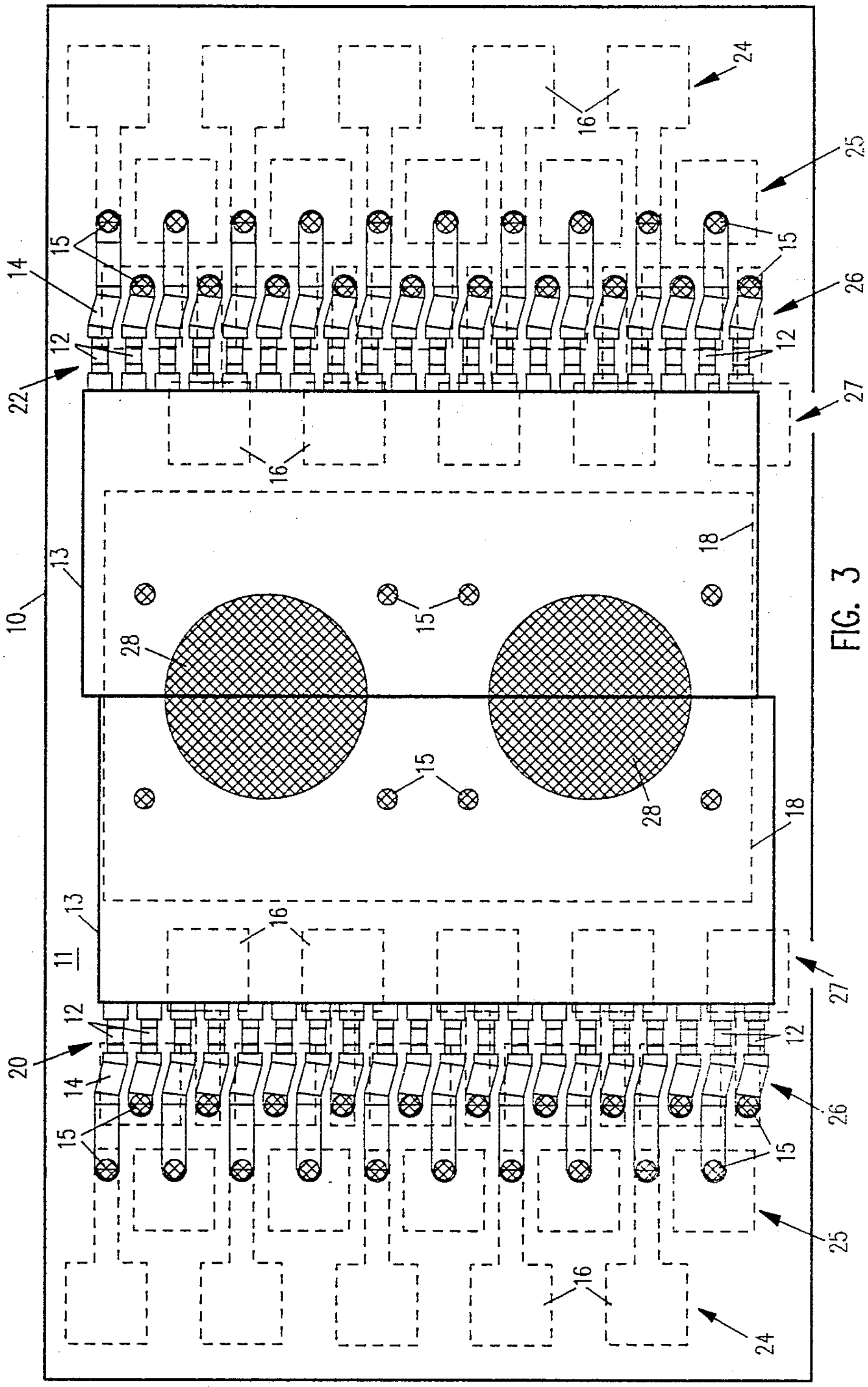
FIG. 3 is a top view of a multi-nozzle thermal ink jet print head array incorporating the present invention.

The top surface 11 of the substrate member 10 for a specific embodiment of an array of resistive heater elements 12 is shown in FIG. 3. The resistive heater elements 12 are aligned in two spaced rows 20, 22, and the heater elements 12 in one row 20 may be staggered with respect to the heater elements 12 in the other row 22, as shown in FIG. 3, if desired. The common electrode 13 makes contact with each of the resistive heater elements 12, and a control electrode 14 also makes contact with each of the resistive heater elements 12. Feed through elements 15 are provided to make contact between one of the control electrodes and a solder pad 16 on the reverse surface of the substrate 10. The solder pads 16 on the reverse surface of substrate 10 are shown in dashed lines in FIG. 3. A larger solder pad 18 is provided for the common electrode, and in this case several feed through elements 15 are provided to reduce the current density of each element 15. Note that the solder pads 16 are provided in four spaced rows 24, 25, 26, 27 so that the electrical connections can be provided within the same physical spacing as the resistive heater elements. Rows 26 of the solder pads 16 are partially obscured by the heater elements and associated electrodes in FIG. 3. The large holes 28 between the two rows 20, 22 of resistive heater elements 12 are ink inlets.

Figure 4:
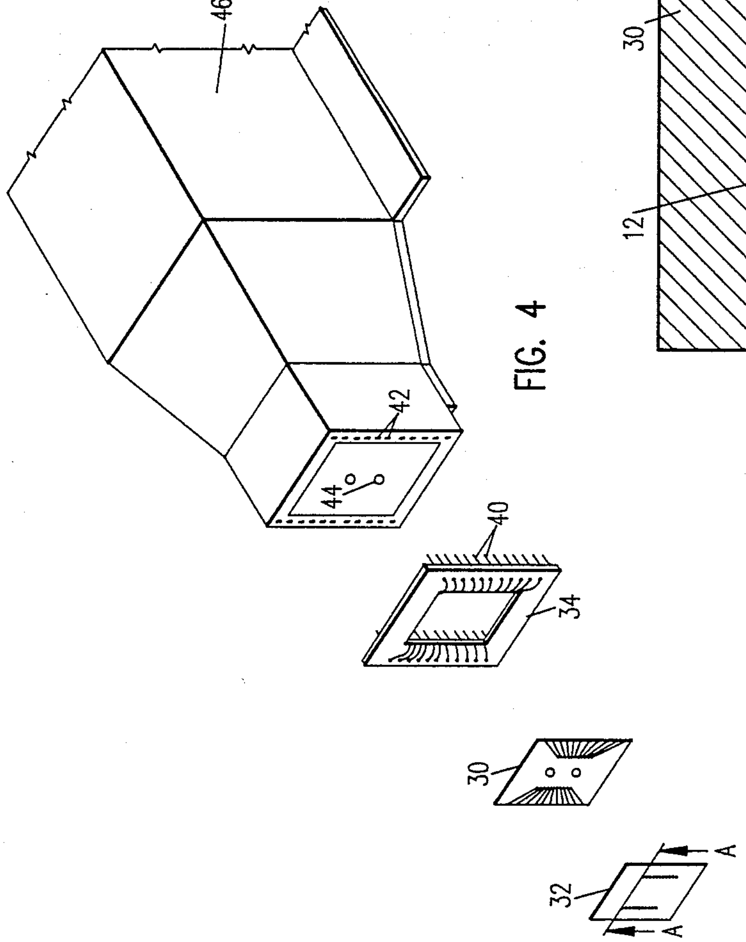
FIG. 4 is a perspective view of an ink jet print head.
Figure 4A:
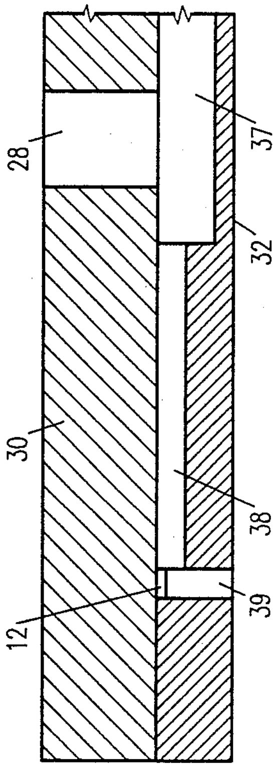
FIG. 4*a* is a partial section view along lines a—a of FIG. 4.

An exploded view of a thermal drop-on-demand ink jet print head is shown in FIG. 4 which can use a heater chip 30 of the type shown in FIG. 3. The heater chip 30 and a nozzle plate 32 are combined with a chip mount 34 to produce a pluggable unit which has both fluid and electrical connections. As shown in FIG. 4*a*, the nozzle plate 32 comprises a plurality of nozzles or orifices 36, each of which has a channel 38 which leads to a manifold 37 which is positioned to receive ink from ink supply openings 28. The nozzle plate is bonded in position so that a nozzle is opposite each of the resistive heating elements 12 so that energizing a selected resistive heating element 12 causes a drop of ink to be ejected from the corresponding nozzle 36.

Chip mount 34 has an array of electrical connecting pins 40 which are spaced to match corresponding openings in electrical connector 42. In addition, ink connector 44 provides a fluid tight path for ink from ink reservoir 46 to move through openings 28 and channels 38 to each of the orifices.

The print head shown in FIG. 4 is symmetrical about the vertical center line (except for the offset in the nozzles in the two rows 20, 22) and therefore is completely modular. Any number of these modules can be stacked vertically to provide any printer from a low end printer application up to page printer and color printing applications.

As the number of nozzles increases, however, the electrode fan-out and the electrical connections to the supporting electronic circuits become increasingly complex. Furthermore, the cost to drive the printer increases significantly since a large number of parallel electronic driver circuits is also required. It is therefore desirable to reduce the number of electrical connections and electronic drivers. The lower operating frequency, narrow drive pulses and non-linear (threshold) bubble nucleation of the bubble jet permit multiplexing to become an effective way to achieve this reduction in electrical connections and electronic drivers.

Figure 5:
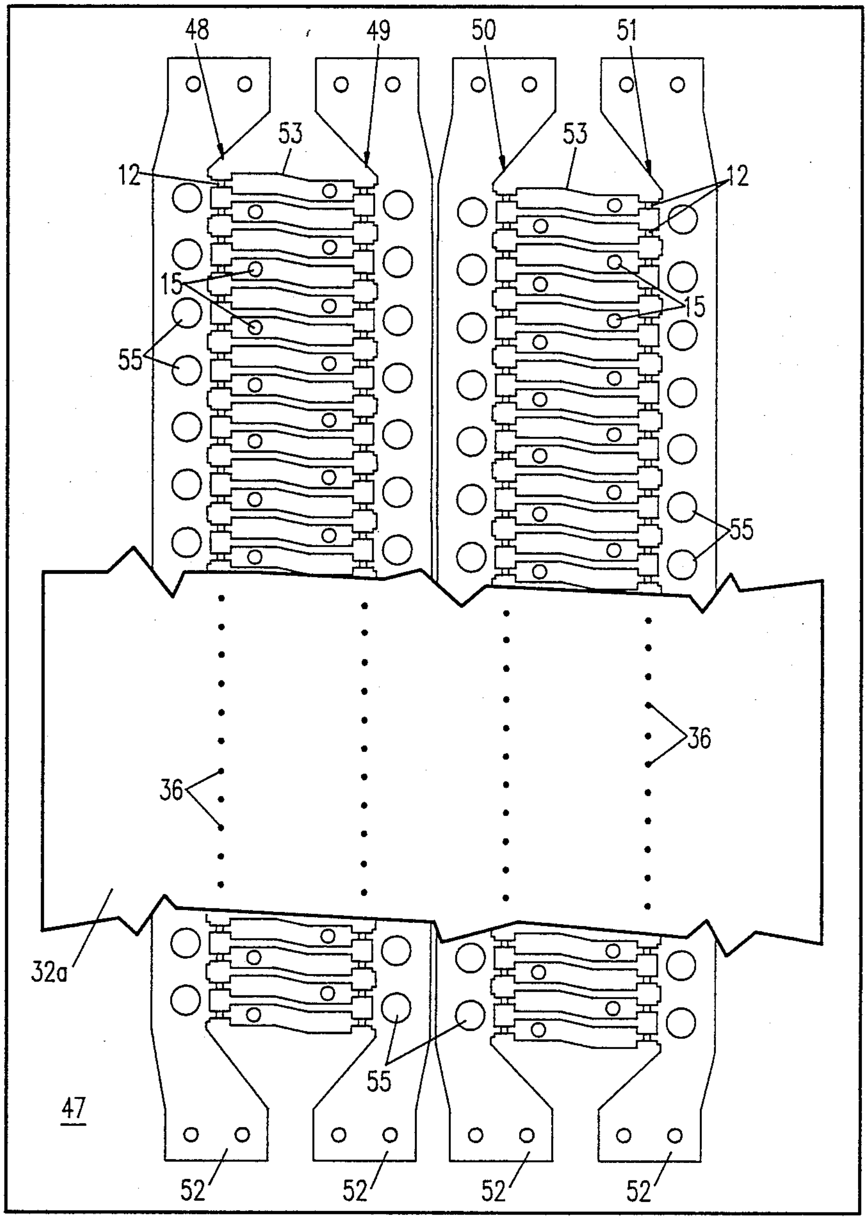
FIG. 5 is a top view of an alternate embodiment of the heater assembly of a thermal ink jet print head designed for multiplexed operation.
Figure 6:
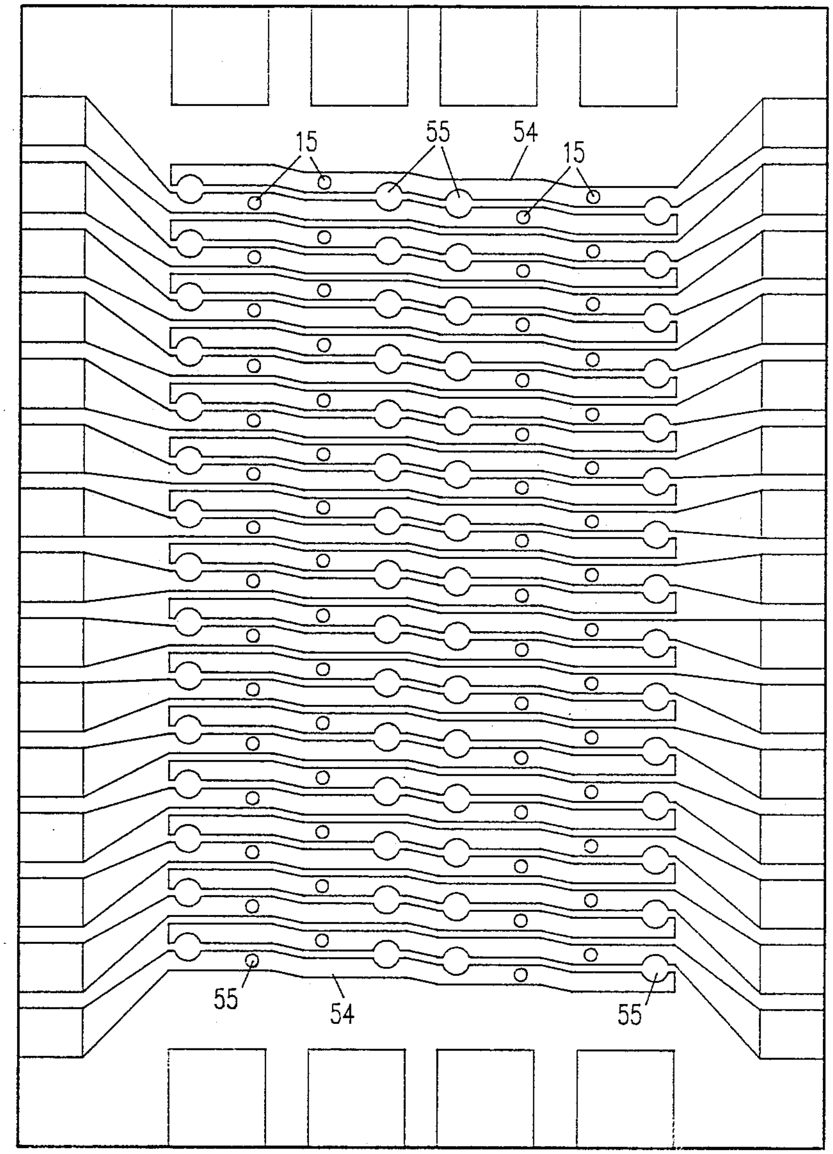
FIG. 6 is a back view of the heater assembly of FIG. 5.

The embodiment of the invention shown in FIG. 5 shows the front surface of the substrate 47 for a multiplex design print head. The nozzle plate 32*a* (partially broken away) is also shown. The nozzle plate 32*a* comprises one nozzle 36 opposite each of the resistive heating means 12 and the nozzle plate 32*a* is fixed to the substrate 47 in a manner similar to that shown in FIG. 4. The print head comprises four parallel spaced rows 48, 49, 50, 51 of resistive heater elements 12 each having an electrical connection to a common electrode 52 and to one of the multiplexing bar electrodes 53. A plurality of feed through elements 15 are provided to make electrical contact to a secondary multiplexing bar 54 (FIG. 6) on the reverse side of the substrate, and a plurality of openings 55 are provided to distribute ink from the ink reservoir. Each of the secondary multiplexing bars 54 is electrically connected to two of the feed through elements 15 so this design represents a multiplexing by a factor of four thereby printing the same print data at the same resolution with the use of only one-fourth the number of electronic drivers. It is obvious that other multiplexing factor could as well be chosen.

Figure 8:
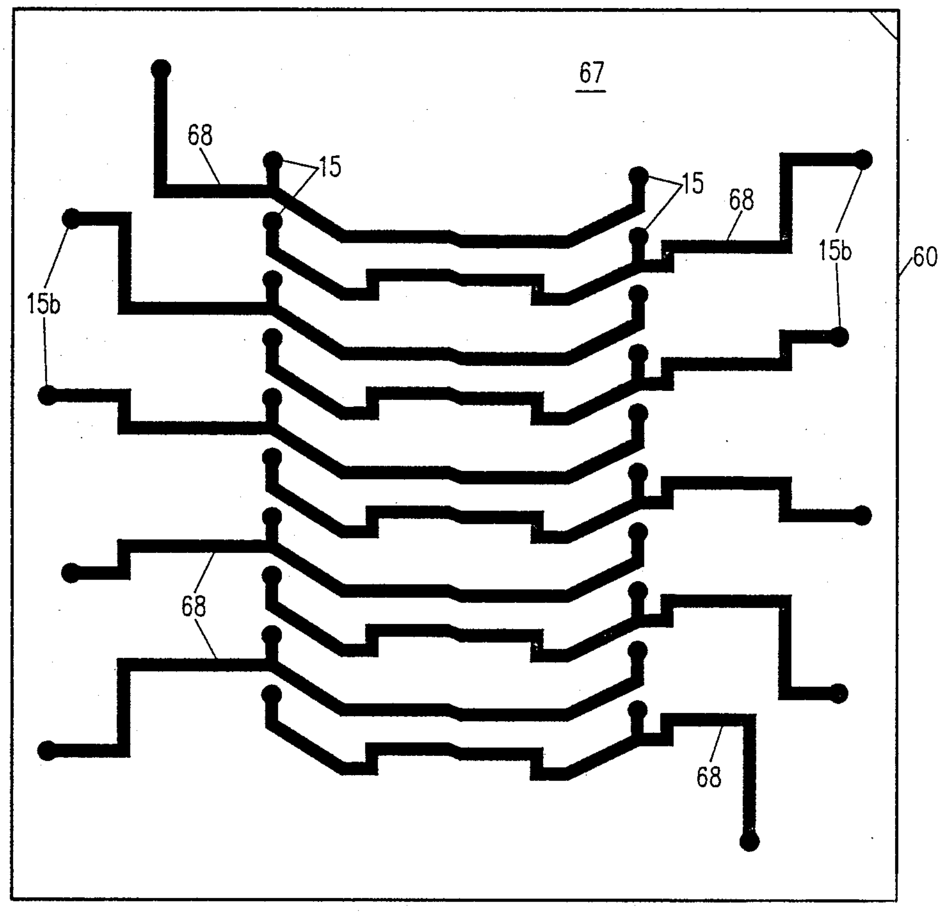
FIG. 8 is a plan view of an intermediate layer interconnect pattern for the heater assembly of FIG. 7.
Figure 9:
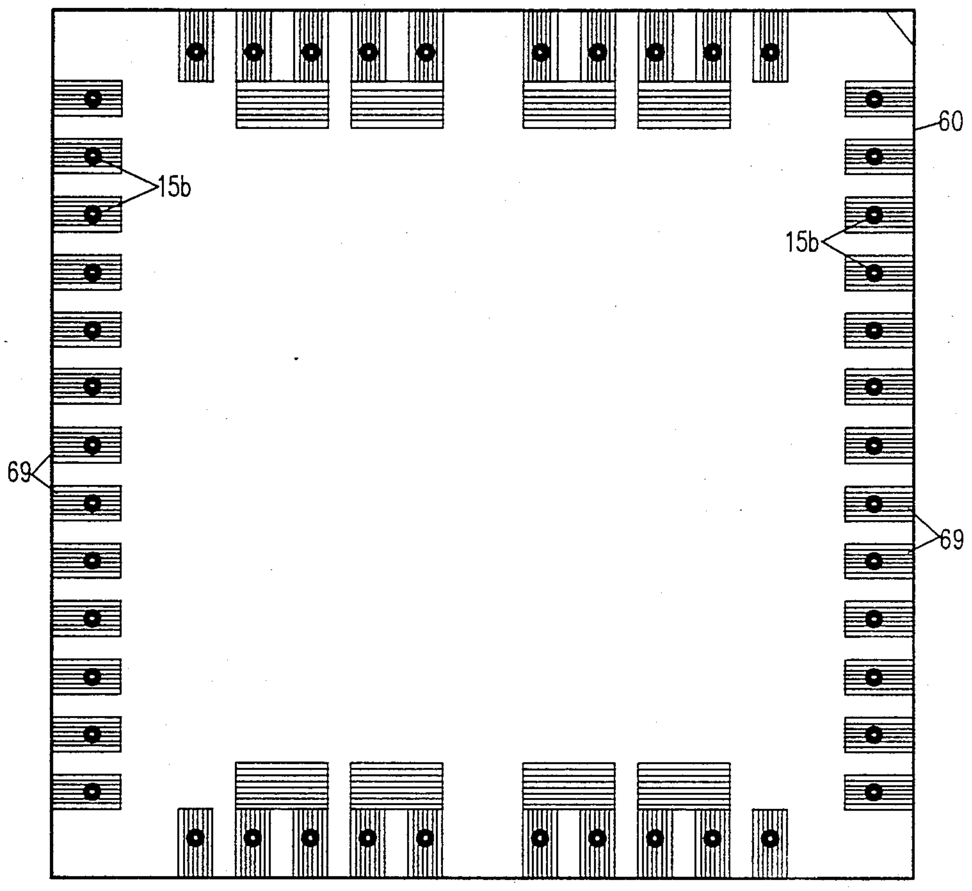
FIG. 9 is a plan view of the contact pads for the back of the heater assembly of FIG. 7.

In some printing applications the required array of conductor lines cannot be reliably produced within the space confines dictated by the required print resolution. In that case the top, intermediate and bottom surfaces of a multilayer ceramic substrate can be used to produce a network of electrical interconnections. An example of such a print head is shown in FIGS. 7, 8 and 9.

Figure 7:
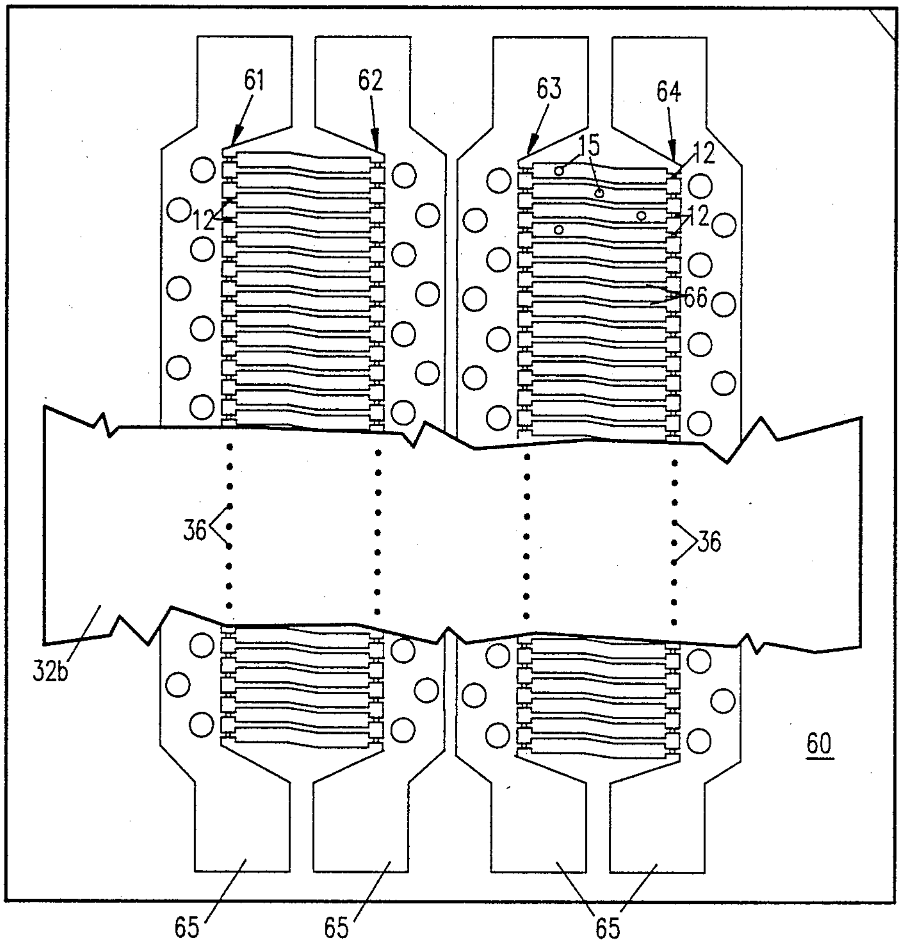
FIG. 7 is a top view of a further embodiment of the heater assembly for a thermal ink jet print head array designed for multiplexed operation.

A view of the pattern on the top surface of the multilayer substrate 60 is shown in FIG. 7. The nozzle plate 32*b* (partially broken away) is also shown. The nozzle plate 32*b* comprises one nozzle 36 opposite each of the resistive heating means 12 and the nozzle plate 32*a* is fixed to the substrate 60 in a manner similar to that shown in FIG. 4. An array of four parallel spaced rows 61, 62, 63, 64 of resistive heater elements 12 is provided, and each of the heater elements is provided with electrical contact to common electrode 65 and to one of the data electrodes 66, which are common to two of the resistive heater elements 12. An array of conductive feed through elements 15 is provided with one of the elements making contact with one of the data electrodes 66 and a conductor pattern on an intermediate layer 67 of substrate 60. As shown in FIG. 8 each of the conductor patterns 68 is common to two of the feed through elements 15 which are in electrical contact with data electrodes 66. Each of the conductor patterns 68 extends near the edge of substrate 60 and is in electrical contact with a conductive feed through element 15*b* which extends through the other intermediate layers, without making electrical contact with the conductor patterns on other intermediate layers, to the back surface of the substrate 60 as shown in FIG. 9. Each of the conductive feed through elements 15*b* makes electrical contact with one of the contact pads 69 on the back surface of the substrate so that suitable electrical connections can be made to the print head without interference to the front side of the substrate 60 where the resistive heater element 12 array is provided.

Figure 10:
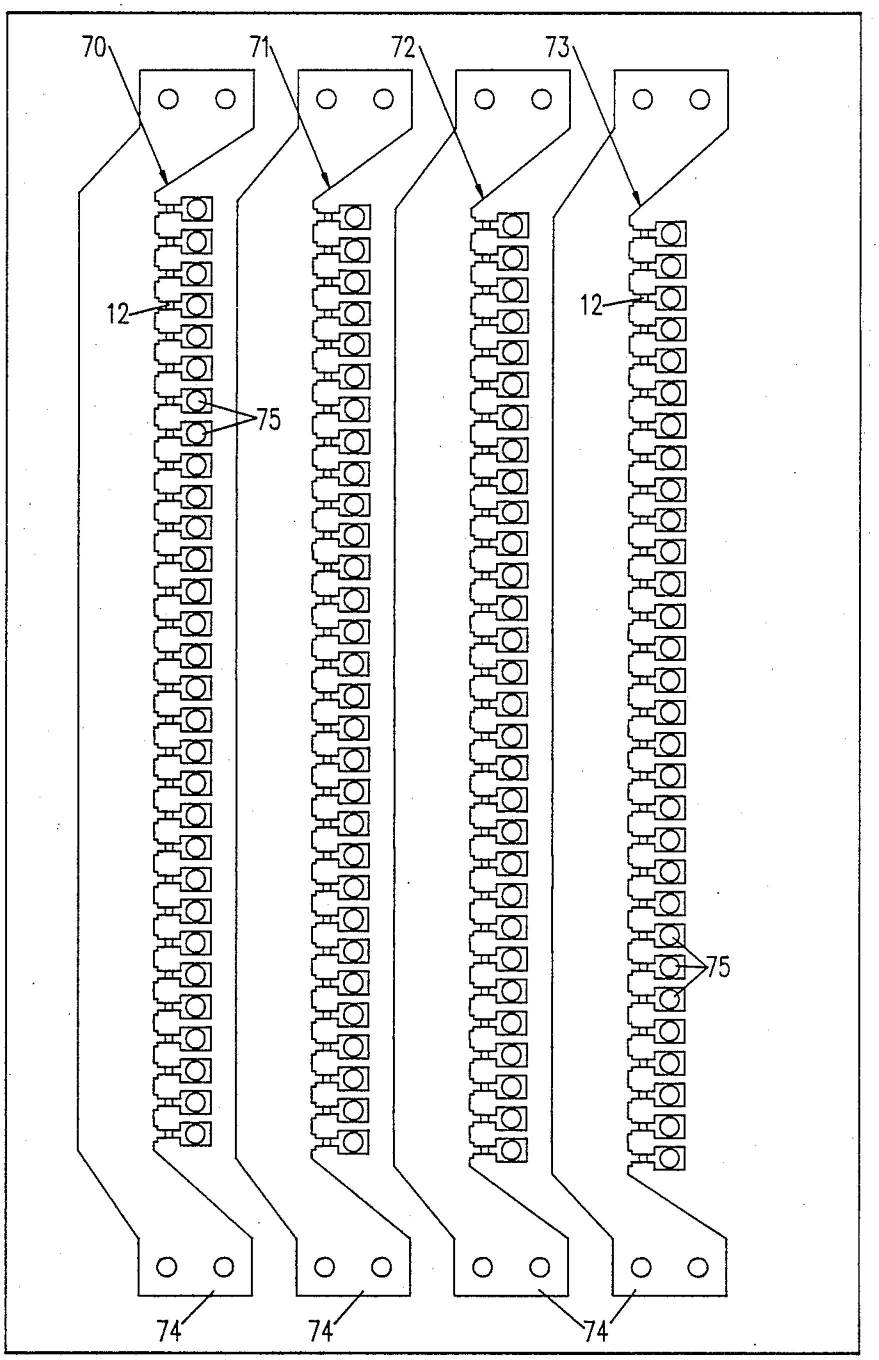
FIG. 10 is a top view of another embodiment of the heater assembly for a thermal ink jet print head array designed for multiplexed operation.

A further embodiment of a thermal drop-on-demand ink jet print head is shown in FIG. 10. In this embodiment a single opening is built to provide not only the electrical contact but also the opening to distribute ink to the various orifices. In this print head, four parallel spaced rows 70, 71, 72, 73 of resistive heater elements 12 are provided along with an electrical contact with common electrodes 74 and with hollow conductive feed through elements 75 which also serve as conduits to distribute the ink from the ink reservoir at the rear of the substrate to the front of the substrate to the array of orifices.

Figure 11:
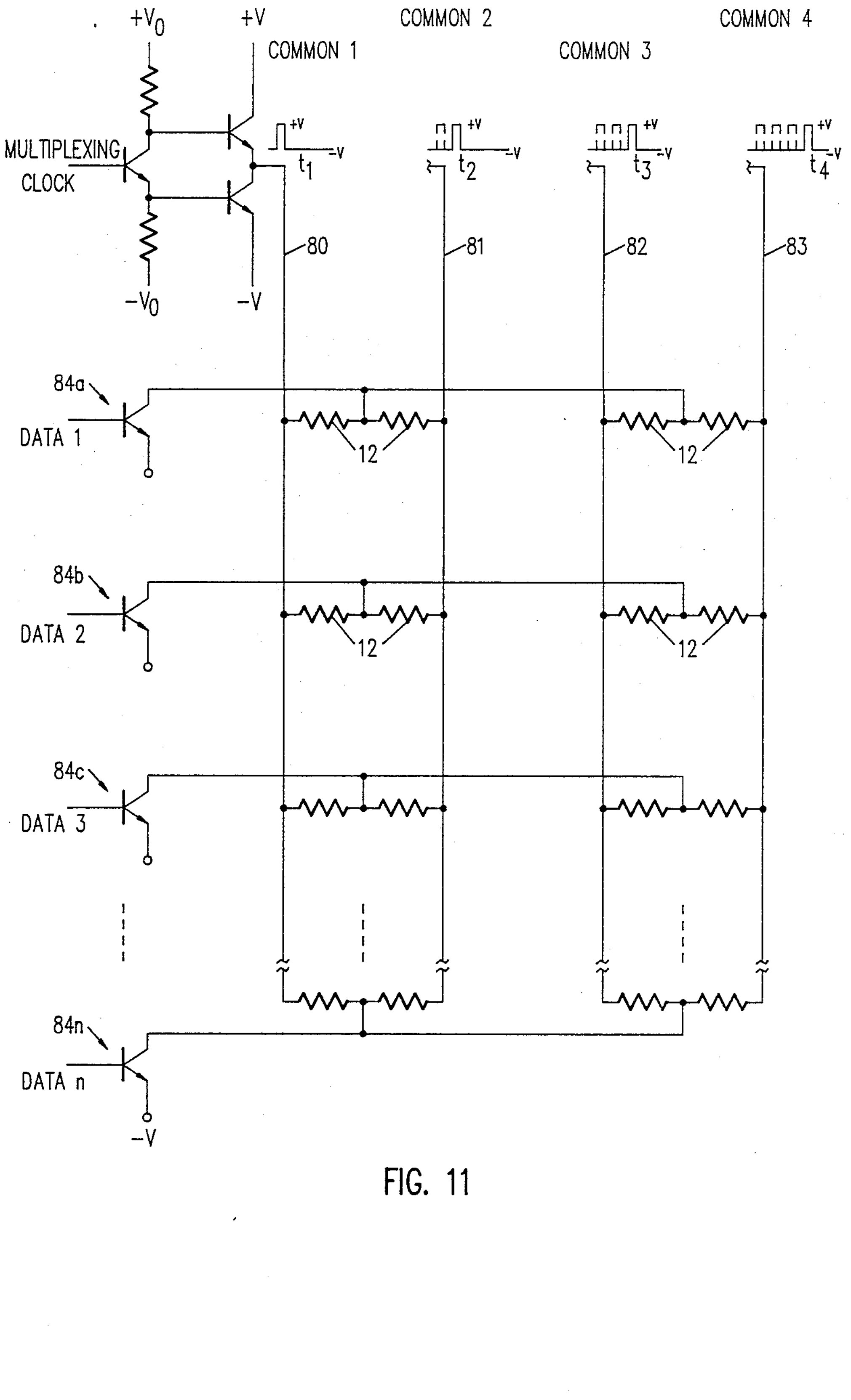
FIG. 11 is a schematic diagram for driving a multiplexed thermal ink jet print head.

A multiplexing drive circuit is shown in FIG. 11. In this circuit, the four vertical common bars 80, 81, 82, 83 are supplied with adequate voltage pulses in sequence, i.e. bar 80 is supplied the first pulse at time t1, bar 81 is supplied the second pulse at time t2 and so on. There is no time-overlap of these pulses and the frequency of occurrence is much higher than the repetition rate of the print clock. The data driver 84*a*, 84*b*, 84*c* . . . 84*n* is turned ON synchronously with the four drive pulses when data signals corresponding to each column are presented to that data driver. In this way, a particular resistive heater element 12 can be turned ON by the full voltage differential and this full voltage differential is present only when a supply voltage pulse (through bars 80, 81, 82 or 83) and a data signal through data drivers 84*a*, 84*b*, 84*c* . . . 84*n*) are concurrently presented to its electrodes. All other resistive heater elements 12 (i.e. the "inactive" ones) also see the drive voltages across the vertical bars 80, 81, 82, 83. However, the voltage differential on each "inactive" element 12 is low enough that no ink vaporization can be accomplished.

The substrate member has been described having a plurality of layers for circuit and ink supply interconnection. Additional layers can be provided, if desired, to provide cooling for the print head during operation. These layers can take the form of cooling fluid channels to provide thermal cooling for the print head. Cooling fluid is circulated through the channels during operation of the print head to absorb heat from the substrate for disposal at some location external to the substrate.

While the invention has been particularly shown and described with reference to a preferred embodiment thereof, it will be understood by those skilled in the art that various other changes in the form and details may be made therein without departing from the spirit and scope of the invention.

Having thus described our invention what we claim as new, and desire to secure by Letters Patent is:

1. A thermal ink jet print head comprising:

a source of marking fluid;

an electrically insulating substrate member;

an array of heating means formed on a first surface of said substrate member, said heating means being formed in at least two groups;

a first array of electrical connection members formed on said first surface of said substrate member, one of said first electrical connection members being in electrical contact with all of said heating means comprising one of said groups;

a second array of electrical connection members deposited on said first surface of said substrate member, each of said second electrical connection members being in electrical contact with one heating means from each of said at least two groups of heating means within said array of heating means;

a third array of electrical connection members on the reverse surface of said substrate member with respect to said first surface;

a first array of electrical conduction members passing through said substrate to provide electrical contact between a plurality of said second electrical connection members and one of the electrical connection members of said third array of electrical connection members, said first array of electrical conduction members having a central opening through at least some of said conduction members to convey said marking fluid; and a nozzle plate fixedly mounted adjacent to said substrate member and having a nozzle aligned with each of said central openings to receive said marking fluid, said nozzle plate having a nozzle therein disposed adjacent to and aligned with each of said heating means whereby, upon connection of a first electrical signal to a selected one of said first array of electrical connection members and, upon connection of a second electrical signal to a selected one of said third array of electrical connection members, a selected one of said heating means is energized and a drop of marking fluid is ejected from the adjacent nozzle.

2. The thermal ink jet print head of claim 1 wherein each of said group of said heating means is formed in a row.

3. The thermal ink jet print head of claim 2 wherein said heating means in one of said rows are staggered with respect to said heating means in another of said rows.

4. A thermal ink jet print head comprising:

a source of ink;

an electrically insulating substrate member;

an array of heating means formed on a first surface of said substrate member, said heating means being formed in at least two groups;

a plurality of common electrode members formed on said first surface of said substrate member, one of said common electrode members being in electrical contact with all of said heating means comprising one of said groups;

a plurality of data electrode members deposited on said first surface of said substrate member, each of said data electrode members being in electrical contact with one heating means from each of said at least two groups of heating means within said array of heating means;

an array of data electrical connection members formed on the reverse surface of said substrate member with respect to said first surface;

an array of electrical conduction members passing through said substrate to provide electrical contact between a plurality of said data electrode members and one of said data electrical connection members, said array of electrical conduction members having a central opening through at least some of said conduction members to convey said ink; and a nozzle plate fixedly mounted adjacent to said substrate member and having a nozzle aligned with each of said central openings to receive said ink, said nozzle plate having a nozzle therein disposed adjacent to each of said heating means whereby, upon connection of a first electrical signal to a selected one of said array of data electrical connection members and, upon connection of a second electrical signal to a selected one of said array of common electrical connection members, a selected one of said heating means is energized and a drop of ink is ejected from the adjacent nozzle.

5. The thermal ink jet print head of claim 4 wherein each of said group of said heating means is formed in a row.

6. The thermal ink jet print head of claim 5 wherein said heating means in one of said rows are staggered with respect to said heating means in another of said rows.

* * * * *